(12) United States Patent
Thepot et al.

(10) Patent No.: US 6,306,923 B1
(45) Date of Patent: Oct. 23, 2001

(54) ULTRAVIOLET OR VISIBLE LIGHT POLYMERIZABLE AND/OR CROSSLINKABLE MALEIMIDE-FUNCTIONAL COATING COMPOSITIONS

(75) Inventors: Phillippe Thepot, Liancourt; Henri Strub, Pont Sainte Maxence, both of (FR)

(73) Assignee: Sartomer Company, Inc., Exton, PA (US)

( * ) Notice: Subject to any disclaimer, the term of this patent is extended or adjusted under 35 U.S.C. 154(b) by 0 days.

(21) Appl. No.: 08/928,061

(22) Filed: Sep. 12, 1997

Related U.S. Application Data

(60) Provisional application No. 60/029,293, filed on Oct. 21, 1996.

(30) Foreign Application Priority Data

Sep. 12, 1996 (FR) .................................................... 96 11134

(51) Int. Cl.$^7$ .............................. C08F 2/48; C08F 22/40; C08F 222/40
(52) U.S. Cl. .......................... 522/107; 522/135; 522/136; 522/137; 522/138; 522/139; 522/140; 522/141; 522/142; 522/143; 522/144; 522/145; 526/262; 526/263
(58) Field of Search .................................... 522/135, 141, 522/142, 107, 136, 137, 138, 139, 140, 143, 144, 145, 104; 526/262, 263

(56) References Cited

U.S. PATENT DOCUMENTS

| | | | |
|---|---|---|---|
| 3,652,716 | * 3/1972 | Holub et al. .......................... | 522/107 |
| 3,742,089 | * 6/1973 | Schroeter ............................. | 522/141 |
| 4,079,041 | * 3/1978 | Baumann et al. ..................... | 522/136 |
| 4,383,903 | * 5/1983 | Ayano et al. ......................... | 522/142 |
| 4,663,424 | * 5/1987 | Stix et al. ............................. | 522/107 |
| 5,446,073 | * 8/1995 | Jonsson et al. ....................... | 522/104 |

FOREIGN PATENT DOCUMENTS

| | | |
|---|---|---|
| 35 07 609 | 9/1985 | (DE) . |
| 40 28 845 | 3/1991 | (DE) . |
| 0 077 840 | 5/1981 | (EP) . |
| 2 430 962 | 3/1980 | (FR) . |
| 2 476 102 | 8/1991 | (FR) . |

* cited by examiner

*Primary Examiner*—Susan W. Berman
(74) *Attorney, Agent, or Firm*—Michael B. Fein; Cozen and O'Connor

(57) ABSTRACT

These compositions comprise at least one compound (A) and at least one compound (B) containing electron enriched or depleted olefinic double bonds, respectively. The compound(s) (A) are prepolymers consisting in the reaction products of at least one maleic anhydride of formula (I); of at least one compound (II) having at least one —NH$_2$ function and at least another function F selected among —OH, —NH$_2$, —NH—, —COOH, —COOR$^3$ or —OOCR$^3$; of at least one compound (III) capable of forming the chain of the prepolymers by polycondensation and/or polyaddition, compound(s) (II) having first reacted with anhydride(s) (I) opening the maleic anhydride rings with formation of maleamic acid functions (f'), the latter having then been at least partially closed again into maleimides N-substituted by groups functionalized by a function F, the functionalities and proportions of compounds (II) and (III) having been selected in order to exclude any gelation of the reaction medium.

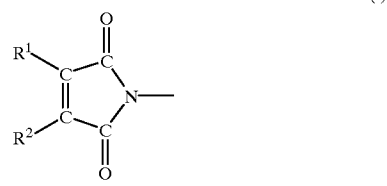

(f)

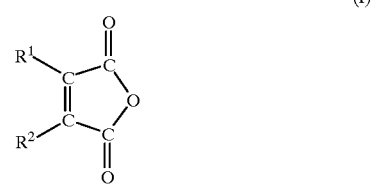

(I)

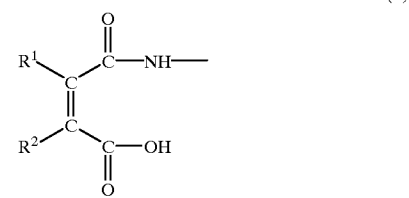

(f')

R$^1$, R$^2$=H, C$_1$–C$_{12}$ alkyl or halogen, R$^3$=C$_1$–C$_5$ alkyl.

27 Claims, No Drawings

ULTRAVIOLET OR VISIBLE LIGHT POLYMERIZABLE AND/OR CROSSLINKABLE MALEIMIDE-FUNCTIONAL COATING COMPOSITIONS

This application claims benefit of Prov. No. 60/029,293 filed Oct. 21, 1996.

The present invention relates to ultraviolet or visible light polymerizable and/or crosslinkable coating compositions, comprising at least one compound (A) containing electron depleted olefinic double bonds and at least one compound (B) containing electron enriched olefinic double bonds.

Maleimides are monomers which are useful as compounds having electron depleted double bonds in radiation polymerizable coating compositions, which also comprise compounds having electron enriched double bonds. The maleimides are all the more interesting in this kind of composition as they allow, if in other respects the compounds having electron enriched double bonds are selected in a suitable manner, to do without any photoinitiator, as described in U.S. Pat. No. 5,446,073.

However, the synthesis of maleimides remains very difficult, which renders these compounds very expensive, and, consequently, which also renders the compositions containing them very expensive.

The maleimides which are currently available on the market (those of which the synthesis is the least expensive) are the maleimides N-substituted by aromatic groups. Such maleimides are hardly soluble, which prevents their use in certain cases. Moreover, the aromatic groups decrease the electron withdrawing character of the maleimides which include them and absorb a part of the ultraviolet light.

Furthermore, in general, the maleimides introduced as monomers may induce migration problems if they are not completely polymerized in the polymerized compositions.

With the objective of providing new maleimides which do not have all the above-mentioned disadvantages, we have now found a new class of compounds of type (A) which consist in prepolymers functionalized by maleimide groups, and which offer many possibilities to satisfy the requirements of the applications such as the coating of optical fibers, the coating of substrates such as wood, paper, metal, plastics, and glass, which require properties of adherence, hardness, flexibility, elasticity, abrasion strength, solvent strength, and weather resistance, thanks to the great adaptability and to the versatility of the synthesis process, which gives access to a very wide range of compounds and which allows to modulate the nature and the structure of the polymer chains according to the desired properties. Besides, this new class of compounds (A) includes aliphatic maleimides, the preparation of which was hitherto difficult, and which are particularly interesting in radiation polymerizable coating compositions, involving both compounds having electron-depleted double bonds and compounds having electron-enriched double bonds. So, it has been found, in a surprising manner, that the reactivity of a formulation, the compound (A) of which is a prepolymer functionalized by maleimide groups as defined hereinbelow, is up to 10 times more efficient than that of an equivalent formulation, the compound (A) of which is a prepolymer similar to the previous one but not functionalized by maleimide groups, and up to 6 times more efficient than the same prepolymer non maleimide-functionalized in mixture with a maleimide monomer available on the market.

In other words, a coating made with the new formulation leads to a tack-free film within a period up to 10 times shorter than with these reference formulations.

The subject of the present invention is thus polymerizable and/or crosslinkable compositions such as defined above, characterized by the fact that said at least one compound (A) is selected among the prepolymers having maleimide functions (f):

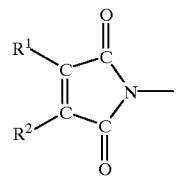

(f)

wherein each of $R^1$ and $R^2$ represents independently H, a $C_1$–$C_{12}$ alkyl group or a halogen,
and consisting in the reaction products:
of at least one maleic anhydride represented by formula (I):

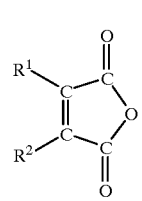

(I)

wherein $R^1$ and $R^2$ are such as defined above;
of at least one compound (II) having at least one —$NH_2$ function and at least another function F selected from the group consisting of —OH, —$NH_2$, —NH—, —COOH, —C—O—$R^3$

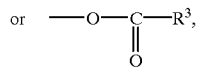

$R^3$ representing a $C_1$–$C_5$ alkyl group;
of at least one compound (III) capable of forming the chain of the prepolymers by polycondensation and/or polyaddition,
said compound(s) (II) having first reacted with said maleic anhydride(s) (I) in order to open the maleic anhydride rings with formation of maleamic acid functions (f'):

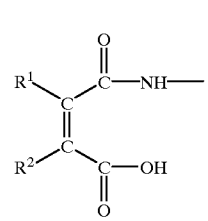

(f')

said maleamic acid functions having then been at least partially closed again under the action of heat into maleimides N-substituted by groups functionalized by a function F,
the chain of said prepolymers having been formed by polycondensation and/or polyaddition:

of the N-substituted maleimide formed bearing the function F;
of compound(s) (III)
of uncyclized products bearing or not a function F formed simultaneously with said N-substituted maleimides;
of maleic anhydride(s) (I) which could have remained in excess after their opening by compound(s) (II);
the functionalities of compound(s) (III) being selected in order to allow the constitution of the chain with the grafting of said N-substituted maleimides on the chain directly by their function F when the latter is at least one selected among —OH, —NH$_2$, —NH— and —COOH, or after transesterification of the functions F when the latter are —COOR$^3$ or —OCOR$^3$ in order to allow the condensation or the addition of said N-substituted maleimide on the chain, the functionalities and proportions of compounds (II) and (III) having been selected in order to exclude any gelation of the reaction medium.

In the prepolymer (A), in general the compound(s) (II) has (have) reacted with anhydride(s) (I) under stoichiometric or substantially stoichiometric conditions or in excess of the anhydride(s) (I) with respect to compound(s) (II).

Preferably, the anhydride of formula (I) is maleic anhydride.

The compounds (II) are especially selected among the compounds represented by the formulae H$_2$N—A—OH, H$_2$N—A—

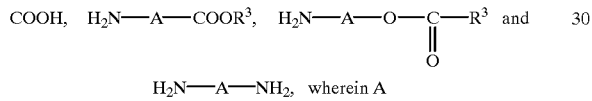 and

H$_2$N—A—NH$_2$, wherein A represents a straight, branched or cyclic alkylene group, or an arylene group, it being possible for said groups to be interrupted by oxygen or sulfur atoms, or by —NR$^4$— groups, wherein R$^4$ represents hydrogen or alkyl.

As examples of these compounds (II),
aminoalcohols, such as ethanolamine, propanolamine, isopropanolamine, 2-(2-aminoethoxy) ethanol, N-(2-amino-ethyl)ethanolamine;
aminoacids, such as valine, p-amino-benzoic acid, alanine, 2-aminohexanoic acid, 6-aminohexanoic acid, 7-aminoheptanoic acid, 2-aminoisobutyric acid;
the methyl or ethyl esters of the abovementioned aminoacids;
the esters of carboxylic acids having 2 to 5 carbon atoms, such as acetic acid, with the abovementioned aminoalcohols;
diamines, such as ethylenediamine, 2-methyl-1,5-pentamethylenediamine, hexamethylenediamine, 2,2,4-and/or 2,4,4-trimethylhexamethylenediamine, dodecamethylenediamine, 5-methylnonamethylenediamine, decamethylenediamine, isophoronediamine, bis(4-aminocyclohexyl)methane, bis(3-methyl-4-aminocyclohexyl)methane, bis(3-methyl-4-amino-5-ethylcyclohexyl)methane, 1,2-bis(4-aminocyclohexyl)-ethane, 2,2'-bis(4-aminocyclohexyl) propane, 2,2'-bis(3-methyl-4-aminocyclohexyl) propane, 4,7-dioxadecane-1,10-diamine, 4,9-dioxadodecane-1,12-diamine, 4,7,10-trioxa-tridecane-1,13-diamine; and
polyoxyethylenated and/or polyoxypropylenated di- or triamines sold under the tradename "Jeffamine®", can be cited.

Trifunctional compounds (II) such as L-serine, 3-hydroxy 4-amino benzoic acid and 3-amino 4-hydroxy benzoic acid and other triamines such as N-(2-aminoethyl)-1,2-ethanediamine and N-(3-aminopropyl)-1,3-propanediamine, can also be cited.

When the N-substituted maleimide has a function F which is —OH, —NH$_2$ or —NH—, the compounds (III) are especially:
at least one polyacid and/or at least one cyclic anhydride; and
at least one compound selected among a polyol, a mono- or polyfunctional epoxy, a polyamine and a polyisocyanate; or
at least one polyisocyanate; and
possibly at least one compound selected among a polyol, a mono- or polyfunctional epoxy, a polyacid and/or a cyclic anhydride and a polyamine.

When the N-substituted maleimide has a function F which is —COOH, the compounds (III) are especially:
at least one compound selected among a polyol, a mono- or polyfunctional epoxy or a polyamine; and
possibly a polyacid and/or a cyclic anhydride or a polyisocyanate; or
at least one polyisocyanate; and
possibly at least one compound selected among a polyol, a mono- or polyfunctional epoxy, a polyacid and/or a cyclic anhydride and a polyamine.

When the N-substituted maleimide has a function F which is

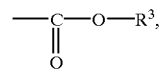

the compounds (III) are especially:
at least one compound allowing the transesterification, having a function —OH and at least one another function selected among —OH, —NH— and —COOH; and
in the case where this other function is —OH or —NH—, the compounds (III) as defined above in the case where the N-substituted maleimide has a function F which is —OH, —NH$_2$ or —NH—; and
in the case where this other function is —COOH, the compounds (III) as defined above in the case where the N-substituted maleimide has a function F which is —COOH.

When the N-substituted maleimide has a function F which is

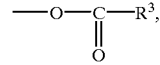

the compounds (III) are especially
at least one compound allowing the transesterification, having an acid function and at least another function selected among —OH, —NH— and —COOH; and
in the case where this other function is —OH or —NH—, the compounds (III) as defined above in the case where the N-substituted maleimide has a function F which is —OH, —NH$_2$ or —NH—; and
in the case where this other function is —COOH, the compounds (III) as defined above in the case where the N-substituted maleimide has a function F which is —COOH.

The polyols as compounds (III) which are used are preferably diols or triols, it being however possible for polyols of higher functionality (pentaerythritol for example) to be present in small amounts. As examples of diols or triols, propylene glycol, dipropylene glycol, diethylene glycol, ethylene glycol, 1,3-butanediol, 1,4-butanediol, neopentyl glycol, triethylene glycol, tripropylene glycol, butylene glycol, glycerol, trimethylol propane, 1,6-hexanediol, 1,4-cyclohexane diol, 1,4-cyclohexane dimethanol, 2-methyl-1,3-propane diol, 2-butyl-2-ethyl-1, 3-propane diol, 1, 2-bis (hydroxyethyl) cyclohexane, 4'-(2-hydroxyethoxy) -2,2-dimethyl-2-hydroxyacetophenone, 2,2-dimethyl-3-hydroxypropyl-2, 2-dimethyl-3-hydroxypropionate and dibromoneopentylglycol, as well as polyether polyols, polyester polyols, polyurethane polyols having a weight average molecular weight which may be in particular between 200 and 1000 can be mentioned.

Monoalcohols may be added in small amounts.

The epoxy compounds as compounds (III) are generally mono- and diepoxy compounds, among which epichlorhydrine, 7-oxa-bicyclo[4.1.0]heptane, 3,4-epoxycyclohexylmethyl 3, 4-epoxycyclohexane carboxylate, bisphenol A diglycidyl ether, 1,2-epoxyhexadecane, 3,3,3-trichloropropylene oxide and allyl glycidyl ether can be mentioned.

The polyisocyanates as compounds (III) are, above all, diisocyanates, such as 4,4'-diphenylmethane diisocyanate, trimethylhexamethylene diisocyanate, toluene diisocyanate, isophoronediisocyanate, tetramethylene diisocyanate, pentamethylene diisocyanate, 4,4'-dicyclohexylmethane diisocyanate, 2,2,4-trimethylhexamethylene-1,6-diisocyanate, triphenylmethane-4,4',4"-triisocyanate, polymethylene polyphenylisocyanate, m-phenylene diisocyanate, p-phenylene diisocyanate, 1,5-naphtalene diisocyanate, naphtalene-1,4-diisocyanate, diphenylene-4, 4'-diisocyanate, 3,3'-bi-tolylene-4,4'-diisocyanate, 1,4-cyclohexylene dimethylene diisocyanate, xylylene-1,4-diisocyanate, xylylene-1,3-diisocyanate, cycloexyl-1,4-diisocyanate and 3,3'-dimethyldiphenylmethane-4,4'-diisocyanate, as well as prepolymers of the polyurea or polyurethane type, having isocyanate ends, and being as a rule of low molecular weight, such as the condensates of polyols and/or polyamines with an excess of polyisocyanate; and the polyisocyanates which contain, in their molecule, an isocyanurate ring and the biurets having isocyanate end functions.

As examples of polyisocyanates which contain, in their molecule, the isocyanurate ring, the trimers of hexamethylene diisocyanate sold by the Company RHÔNE-POULENC under the denomination TOLONATE HDT, the tris [1-(isocyanatomethyl)-1,3,3-trimethylcyclohexane] isocyanurate sold by the Company HULS under the denomination VESTANAT T 1890/100, can be cited.

As examples of biurets, the biurets, of the diisocyanato-1, 6-hexane sold under the denomination DESMODUR N100 by the Company BAYER, can be cited.

As main examples of polyacids as compounds (III) diacids, such as maleic, fumaric, chloromaleic, citraconic, metaconic, itaconic, tetraconic, orthophthalic, isophthalic, terephthalic, succinic, methylsuccinic, adipic, sebacic, tetrabromophthalic, tetrachlorophthalic, glutaric, pimelic, pyromellitic acids or the like, can be cited.

The cyclic anhydrides used as compounds (III), which are unsaturated or saturated, can be selected among maleic anhydride, succinic anhydride, phthalic anhydride, trimellitic anhydride, pyromellitic anhydride, tetrahydrophthalic anhydride, hexahydrophthalic anhydride, chlorinated anhydrides such as chlorendic anhydride, tetrachlorophthalic anhydride and tetrabromophtalic anhydride, methyltetrahydrophthalic anhydride, nadic anhydride, methyl nadic anhydride, itaconic anhydride, citraconic anhydride, and glutaric anhydride. Maleic anhydride and succinic anhydride are particularly mentioned. An anhydride including a photoinitiator moiety, such as 3,3',4,4'-benzophenonetetracarboxylic dianhydride, may be used in some applications.

The polyamines as compounds (III) are preferably selected among diamines, such as ethylene diamine, 2-methyl-1,5-pentamethylene diamine, trimethylexane-1,6-diamine, hexamethylene diamine, 2,2,4- and/or 2,4,4-trimethylhexamethylenediamine, dodecamethylenediamine, trimethylhexamethylenediamine, 5-methyl-nonamethylenediamine, decamethylenediamine, isophoronediamine, bis(4-aminocyclohexyl)methane, bis(3-methyl-4-aminocyclohexyl)methane, bis (3-methyl-4-amino-5-ethylcyclohexyl)methane, 1,2-bis(4-aminocyclohexyl)ethane, 2',2'-bis(4-aminocyclohexyl)propane and 2,2'-bis(3-methyl-4-aminocyclohexyl)propane.

Examples of compounds (III) allowing the transesterification, having an OH function and at least another function selected among —OH, —NH— and —COOH, are 2-hydroxybenzene acetic acid, parahydroxy benzoic acid, metahydroxy benzoic acid, 2-hydroxy-3-methyl benzoic acid, 2-hydroxy 4-methyl benzoic acid, 2-hydroxy 5-methyl benzoic acid, 2-(butylamino)-ethanol, 2-(cyclohexylamino)ethanol, 2-(phenylamino)-ethanol, 3-hydroxypiperidine, 4-hydroxypiperidine, dipropylene glycol, tripropylene glycol, triethylene glycol, 1,6-hexanediol, 1,4-cyclohexanediol, 1,4-cyclohexanedimethanol, 2-butyl 2-ethyl, 1,3-propanediol and 1,2-bis (hydroxethyl) cyclohexane.

Examples of compounds (III) allowing the transesterification, having an acid function and at least another function selected among —OH, —NH— and —COOH are 2-hydroxybenzene acetic acid, parahydroxy benzoic acid, metahydroxybenzoic acid, 2-hydroxy 3-methyl benzoic acid, 2-hydroxy 4-methyl benzoic acid, 2-hydroxy 5-methyl benzoic acid, N-methyl glycine, 2-methylamino benzoic acid, orthophtalic acid, terephthalic acid, isophthalic acid, adipic acid, pimelic acid, sebacic acid, tetrabromophtalic acid and tetrachlorophtalic acid.

The number average molecular weight ($\overline{Mn}$) of the prepolymers (A) can be between 350 and 5000, especially between 500 and 3000 (as measured by GPC, polystyrene standard). Moreover, said prepolymers can include 0.02 to 5 moles of maleimide groups, especially 0.05 to 2 moles of maleimide groups, by kg of prepolymer.

Furthermore, after the formation of the prepolymers (A), the acid end functions of the latter may have been reacted with a monoepoxy compound in order to adjust the acid value of said prepolymers especially to an acid value lower than 5 mg KOH/g.

To prepare prepolymers (A) such as defined above, the following process can be carried out: at least one compound (I), at least one compound (II) and at least one compound (III)—said compounds (I), (II) and (III) being as defined above—are reacted under such conditions which allow to compound(s) (II) to react first with maleic anhydride(s) (I) in order to open maleic anhydride rings, maleamic acid functions being formed by opening said maleic anhydride rings by the primary amine function of said compound(s) (II) then being closed again at least partially into maleimide rings, under the action of heat, the maleimides so formed reacting with said compound(s) (III) and the chain of said prepolymer being formed by polycondensation and/or polyaddition reactions involving said compound(s) (III) and/or, in case where it would remain an excess of maleic anhydride after opening of (I) by (II), said excess of maleic anhydride (I), the uncyclized products entering also into the composition of the chain, the functionalities and proportions of compounds (II) and (III) having been selected in order to exclude a gelation of the reaction medium.

According to a first embodiment of this process, in a first step, at least one maleic anhydride (I) is reacted with at least one compound (II) in a polar solvent medium under stoechiometric or substantially stoechiometric conditions in order to open the anhydride rings;

in a second step, after evaporating said polar solvent and possibly after addition to the reaction medium of at least one polyacid and/or one cyclic anhydride as compound (III), a ring forming reaction is conducted by heating the reaction medium obtained at the end of the first step, wherein said ring forming reaction results in at least partially closing the maleic anhydride rings which were opened in the previous step, in order to give a product of at least partially ring forming reaction which comprises maleimides N-substituted by groups functionalized by —OH or —COOH or —COOR$^3$ or —OCOR$^3$ or —NH$_2$ or —NH— according to the compound(s) (II) used, in case where the ring forming reaction has been conducted in the absence of any cyclic anhydride (III), or maleimides N-substituted by groups functionalized by —COOH or —COOR$^3$ or —OCOR$^3$ with formation of the diacid corresponding to said cyclic anhydride (III), possibly in mixture with the excess of anhydride (III) or (I) not reacted, in case where the ring forming reaction has been conducted in the presence of cyclic anhydride (III); and in a third step, said product of the at least partially ring forming reaction is entered into a polycondensation and/or polyaddition reaction with at least one compound (III) as defined above.

At the first step, the maleic anhydride rings are opened by at least a part of —NH$_2$,—NH— or OH functions of compound(s) (II), the opening by —NH$_2$ functions leading to maleamic acid functions

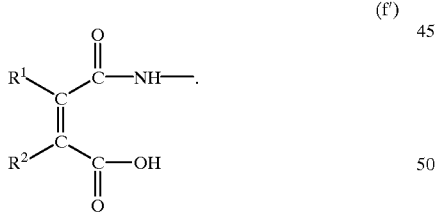

(f')

According to the type of compound (II) used, the opening of one or more maleic anhydride rings by said compound (II) may be obtained. The COOH or COOR$^3$ or —OCOR$^3$ functions of (II), possibly present, remain free.

This first step is generally conducted at a temperature of 0 to 80° C., especially of 0 to 20° C., during 1 to 10 hours, especially during 1 to 3 hours, in a polar solvent such as acetone, ethanol, chloroform, dichloromethane, tetrahydrofuran, cyclohexanone, dioxane, methylethylcetone and ethyl acetate.

Before starting the second step (at least partial cyclization), except if the same solvent is kept, the polar solvent of the first step is removed in general by evaporation. Otherwise, said solvent can be advantageous recycled. The cyclization is advantageously conducted in the presence of at least one cyclization catalyst, which is generally selected among metallic salts such as magnesium nitrate, chloride, bromide, sulphate and acetate, lithium nitrate, chloride, bromide and acetate, manganese (II) nitrate, chloride and acetate, cobalt (II) nitrate, chloride, bromide, sulphate and acetate, as well as zinc salts of maleamic acid.

In the case where the second step is conducted in the presence of cyclic anhydride [(III) and/or an excess of (I)], it is conducted generally at a temperature of 40 to 160° C., especially of 80 to 120° C., during 0.5 to 10 hours, especially during 1 to 6 hours, in an aprotic solvent such as toluene and xylene. One can also work in the absence of any solvent; the excess of anhydride could be considered as acting as a solvent.

In the case where the second step is conducted in the absence of anhydride, it is conducted generally at a temperature of 40 to 160C., especially of 80 to 110° C., during 0.5 to 10 hours, especially during 3 to 7 hours, in a solvent of the amic acid as obtained in the first step. Ethanol and methanol can be mentioned.

The solvent used in this step is then generally evaporated and otherwise it can advantageously be recycled.

The polycondensation and/or polyaddition reactions of this third step are conventional reactions well known to the man skilled in the art.

In the case of a polycondensation with at least one polyol or one epoxy, and possibly with at least one polyacid or one anhydride, this step can conducted at a temperature of 150 to 250° C., possibly in the presence of at least one esterification catalyst such as, for example, tetrabutyl titanate, tetrabutyl zirconate, zirconium naphthenate, mixtures of tin oxalate and sodium acetate, stannous chloride, stannic chloride, dibutyltin oxide, tributyltin hydroxide, and butyl stannoic acid, and possibly in the presence of at least one radical polymerization inhibitor such as hydroquinone and its derivatives such as hydroquinone monomethyl ether, trimethylhydroquinone, quinone and its derivatives such as toluhydroquinone, tertiobutyl monohydroquinone, paratertiobutylcatechol, phenothiazine, N,N-dialkylhydroxyamines, nitrobenzene, ditertiobutylcatechol, p-phenolaniline, di-(2-ethylhexyl)-octylphenyl phosphite, 2,5-ditertiobutyl-4-hydroxytoluene, copper naphthenate, methylene blue and mixtures thereof. As a rule, the catalyst or the mixture of catalysts is used in an amount of about 0.01 to about 0.2% by weight of the reaction mixture, and the inhibitor or the mixture of inhibitors is used in an amount of about 0.01 to about 0.2% by weight of the reaction mixture. The beginning of the reaction is generally conducted at the atmospheric pressure, the end being possibly conducted under reduced pressure.

In the case of a reaction with a polyisocyanate, and, possibly, with at least one polyacid and/or one polyol and/or one epoxy, it being possible for an anhydride to be present if a polyol is also present, said third step can be conducted at a temperature of 20 to 200° C., it being possible for the addition reaction of the polyacid with the polyisocyanate to be carried out in the presence of a catalyst, such as triethylamine, benzyldimethylamine, 1,4-diazabicyclo[2.2.2]octane, potassium or sodium cyanide, it being possible for the reaction addition of the polyol with the polyisocyanate to be carried out in the presence of a catalyst such as triethylamine, cobalt naphtenate, stannous chloride, stannic chloride, tributyltin hydroxide, dibutyltin oxide, dibutyltin dilaurate, tetrabutyltin.

In case where the second step is conducted in the presence of anydride [(III) or excess of (I)], it is possible to add at the third step a polyisocyanate and/or a polyol, with possibly a polyacid (III); in case where the second step is conducted in the absence of anhydride, it is possible at the third step to add either a polyisocyanate alone, either a polyisocyanate and a polyol and/or a polyacid.

If there are esterification reactions (acid+alcohol) and addition reaction, esterification reactions are carried out first between 150 and 250° C., then the addition reactions (isocyanate+alcohol or acid) at temperatures lower than 150C.

Otherwise, in a preliminary step, the double bond

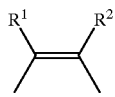

of the anhydride (I) is protected by a reaction with a protecting agent such as furan, furan derivatives, cyclopentadiene and cyclopentadiene derivatives, furan and cyclopentadiene being preferred, the deprotection being carried out at a time from the second step under the action of heat.

Consequently, the process according to this embodiment is a "one pot" process, which does not require to isolate the reaction products after each step, the only measure to be taken after the first and second steps being the evaporation of the solvent.

According to a second embodiment of this process,
in a first step, at least one maleic anhydride (I) is reacted with at least one compound (II) in a polar solvent medium, at a temperature of 20–150° C., especially of 80–130° C., said compounds (I) being introduced in a stoichiometric excess with respect to compound(s) (II), in order to form a partially ring forming product having N-substituted maleimides functionalized by

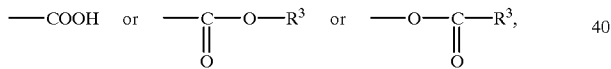

products of the opening of anhydride(s) (I), diacid corresponding to anhydrid (I) possibly in mixture with the excess of anhydride (I); and in a second step, said partially ring forming product is entered in a polycondensation and/or polyaddition reaction with at least one compound (III) such as defined above.

According to a third embodiment of this process at least one compound (I), at least one compound (II) and at least one compound (III) selected among polyols, epoxy and polyamines, and possibly polyacids and cyclic anhydrides, are reacted in the absence of any solvent, in a stoechiometric excess of compound(s) (I) with respect to compound(s) (II), at a temperature of 180° C.–200° C. which is reached by steps or directly or gradually, with removing the possible condensation water, it being then possible to bring the mixture to a temperature lower 160° C., to add at least one polyisocyanate (III) and to conduct the alcohol/isocyanate reaction at that temperature.

According to a fourth embodiment of this process at least one compound (I) and at least one compound (II) are reacted in a stoichiometric excess of compound(s) (I) with respect to compound(s) (II), in the absence of any solvent, at a temperature of 20–150° C., during 1 to 3 hours, then at least one compound (III) selected among polyols, epoxy and polyamines and possibly polyacids and cyclic anhydrides is added, and the reaction medium is brought to a temperature of 180° C.–200° C., which is reached by steps or directly or gradually, with removing the possible condensation water, it being then possible to bring the mixture to a temperature lower than 160° C., to add at least one polyisocyanate (III) and to conduct the alcohol/isocyanate reaction at that temperature.

According to a fifth embodiment of this process at least one compound (I), at least one compound (II) and, as compounds (III), at least one polyisocyanate and at least one polyacid, and possibly at least one compound selected among polyols, epoxy and polyamines, are reacted in the absence of any solvent, in a stoichiometric excess of compound(s) (I) with respect to compound(s) (II), at a temperature lower than 160° C.

The processes according to these second to fifth embodiments are also of the "one-pot" type.

An additional step may be carried out in order to lower the acid value of some prepolymers, for instance to an acid value lower than 5 mg KOH/g by addition of a monoepoxy under conditions which are well known to the one skilled in the art, generally at a temperature of the order of 110 to 150° C., so that this monoepoxy can react with the residual carboxylic groups of the prepolymer.

The composition according to the present invention can optionally further comprise at least one compound (A') selected among N-substituted maleimides, represented by the formula:

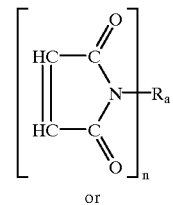

or

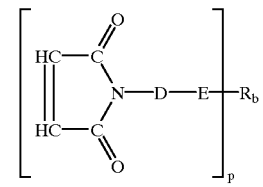

wherein:
$R_a$, $R_b$=mono- to tetravalent hydrocarbon group, which is aliphatic, aromatic or which has an aliphatic-aromatic structure;

n, p=1 to 4;

D=alkylene, arylene, alkylarylene or arylalkylene group; and

E is an ester linkage (COO or OCO) or an urethane linkage

Examples of these maleimides wherein n=1 and $R_a$ is an alkyl having especially 1 to 12 carbon atoms or arylalkyl, aryl or alkylaryl radical, having especially from 6 to 12 carbon atoms, are N-ethylmaleimide, N-isopropylmaleimide, N-n-butylmaleimide, N-isobutylmaleimide, N-tert.-butylmaleimide, N-n-octylmaleimide, N-cyclohexylmaleimide, N-benzylmaleimide and N-phenylmaleimide.

Said at least one compound (B) making part of the composition according to the present invention is advantageously selected among:

compounds represented by the formula (V)

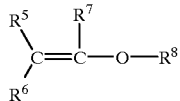

(V)

wherein:
each of $R^5$, $R^6$ and $R^7$ represents independently hydrogen or an aliphatic group, preferably a $C_1$–$C_{12}$ alkyl group, such as methyl, ethyl and propyl; and
$R^8$ represents an aliphatic group or an aromatic group, optionally substituted for example by OH;

compounds represented by the formula (VI):

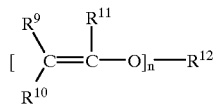

(VI)

wherein:
each of $R^9$, $R^{10}$ and $R^{11}$ represents independently hydrogen or an aliphatic group, preferably a $C_1$–$C_{12}$ alkyl group, such as methyl, ethyl and propyl; and
$R^{12}$ is a n-valent residue of an organic polyol;
n is an integer from 2 to 6;

N-vinyl pyrrolidone, N-vinyl imidazole, 2-vinyl pyridine, N-vinylcarbazole, N-vinyl caprolactam, para-methoxystyrene, isoeugenol, 4-propenyl-anisole, monobutyl 4-vinylbutoxy carbonate, monobutyl 4-propenyl butoxycarbonate, N-vinyl-formamide and its derivatives.

As preferred compounds of formula (V), the following monofunctional vinylethers can be mentioned: methyl vinyl ether, ethyl vinyl ether, butyl vinyl ether, isobutyl vinyl ether, octadecyl vinyl ether, 4-hydroxybutyl vinyl ether, dodecyl vinyl ether.

As preferred compounds of formula (VI), the following polyfunctional vinylethers, in particular those obtained in a known manner from a di-, tri- or tetrafunctional organic diol, acetylene and a basic catalyst under high pressure can be mentioned. Especially, the following ones can be mentioned: triethylene glycol divinyl ether, tripropylene glycol divinyl ether, diethylene glycol divinyl ether, 1,4-butanediol divinyl ether, tetraethylene glycol divinyl ether, cyclohexanedimethanol divinylether, bis (4-vinyloxybutyl) succinate, bis (4-vinyloxymethyl-cyclohexylmethyl) glutarate, 1,3-benzenedicarboxylic acid, bis [4-(ethenyloxy)butyl] ester.

In general, the ratio of the number of double bonds of said at least one electron enriched compounds (B) to the number of double bonds of said at least one electron depleted compounds (A) and possibly (A') is in the range between 1:5 to 5:1, preferably between 0.8:1 and 1:0.8.

As already mentioned, the use of the compounds (A) according to the invention allow to completely get rid of the conventional photoinitiators and photosensitizers.

In some applications, it is however possible to contemplate the use of photoinitiators and photosensitizers; in such a case, the concentrations of the latter are lower than those commonly used.

As examples of photoinitiators,

α-diketones, such as benzile and diacetyle;

acyloins, such as benzoin;

acyloin ethers, such as benzoin methyl ether, benzoin ethyl ether, benzoin isopropyl ether and benzoin isobutyl ether;

thioxanthones, such as thioxanthone, 2,4-diethylthioxanthone, thioxanthone-1-sulfonic acid, sulfonic isopropyl-thioxanthone-4, isopropylthioxanthone and 2-chlorothioxanthone;

benzophenones, such as benzophenone, 4,4'-bis (dimethylamino)benzophenone, 4,4'-bis(diethylamino) benzophenone, 4,4'-diethylaminobenzophenone, Mischler ketone;

propiophenones, such as 2-hydroxy-2-methylpropiophenone, 4'-isopropyl-2-hydroxy-2-methyl-propiophenone;

acetophenones, such as acetophenone, p-dimethyl-aminoacetophenone, α,α'-dimethoxyacetoxyacetophenone, 2,2-dimethoxy-2-phenylacetophenone, p-methoxy-acetophenone, 2-methyl-[4-(methylthio)phenyl]-2-morpholino-1-propanone, 2,2-diethoxyacetophenone, 4'-phenoxy-2, 2-dichloroacetophenone, 2-benzyl-2-N,N-dimethylamino-1-(4-morpholinophenyl)-butanone-1, 2,2-dimethoxy-2-phenyl-acetophenone, 2-hydroxy-2-methyl-1-phenylpropanone;

quinones, such as anthraquinone, 2-ethyl-anthraquinone, 2-chloroanthraquinone, 1,4-naphtoquinone alpha-hydroxyarylketones, such as 1-hydroxycyclohexyl phenyl ketone;

halogenated compounds, such as phenacyl chloride, tribromomethylphenylsulfone, tris(trichloromethyl)-s-triadine;

peroxides, such as di-t-butyl peroxide; and other compounds such as benzile diméthyl ketal; isoamyl N,N-dimethylaminobenzoate, ethyl N,N-dimethylaminobenzoate, benzoin benzoate, 2-hydroxy-2-methyl-1-phenyl propanone, α-acyloxime ester, can be cited.

These compounds can be used either individually as photoinitiator, either as a mixture of at least two of them as a photoinitiator system. Furthermore, at least one photoactivator can be associated with the photoinitiator or with the photoinitiator system.

The compositions according to the invention can also include at least one component selected among a monomer or oligomer reactive diluent, a non reactive solvent or diluent, and an usual additive such as a pigment.

As examples of monomer or oligomer reactive diluent, the following compounds can be cited: vinyl monomers, such as vinyl acetate, styrene, vinyl toluene, divinyl benzene; acrylic and methacrylic esters, such as methyl (meth) acrylate, ethyl (meth)acrylate, isopropyl(meth)acrylate, n-butyl(meth)acrylate, isobutyl (meth)acrylate, 2-ethylhexyl (meth)acrylate, 2-hydroxyethyl (meth)acrylate, glycidyl (meth)acrylate, ethylene glycol di(meth)acrylate, diethylene glycol (di)methacrylate, tetraethylene glycol di(meth) acrylate, glycerol di(meth)acrylate, glycerol tri (meth) acrylate, 1,3-propylene glycol di(meth)acrylate, dipropylene glycol di(meth)acrylate, tripropylene glycol di(meth)

acrylate, 1,4-butanediol di(meth)acrylate, 1,2,4-butanetriol tri(meth)acrylate, 1,6-hexanediol di(meth)acrylate, 1,4-cyclohexanediol di(meth)acrylate, 1,4-benzenediol di(meth)acrylate, pentaerythritol tetra(méth)acrylate, 1,5-pentanediol di(meth)acrylate, trimethylolpropane di(meth)acrylate, trimethylolpropane tri(meth)acrylate, 2,2-dimethyl-3-hydroxypropyl-2,2-dimethyl-3-hydroxy-propionate, isobornyl (meth)acrylate and tetrahydrofurfuryl (meth)acrylate; (meth)acrylates derived from aromatic glycidyl ethers such as bisphenol A—diglycidyl ether and derived from aliphatic glycidyl ethers such as butanediol diglycidyl ether, specific examples of them comprising 1,4-butanediol diglycidylether di(meth)acrylate, bisphenol A—diglycidylether di(meth)acrylate and neopentylglycol diglycidylether di(meth)acrylate; and acrylic or methacrylic amides such as (meth)acrylamide, diacetone (meth)acrylamide, N(beta-hydroxyethyl) (meth)acrylamide, N,N-bis(beta-hydroxyethyl) (meth) acrylamide, methylene bis (meth) acrylamide, 1, 6-hexamethylene bis (meth) acrylamide, diethylenetriamine tris(meth)acrylamide, bis (gamma-(meth)acrylamidepropoxy)ethane and beta-(meth)acrylamide éthylacrylate.

As examples of non reactive solvent or diluent, the following compounds can be cited: ethyl acetate, butyl acetate, methoxypropanol, isopropanol, methyl ethyl ketone, acetone.

The pigments are among others phthalocyanine blue and titanium dioxide.

The composition according to the present invention can be under the form of a water emulsion or of a water dispersion.

If desired, the compositions of the present invention are stabilized. The stabilization is carried out with the use of one or more radical polymerization inhibitors which are used in conventional amounts and which can be selected among the phenolic type inhibitors, the quinones, phenothiazine and its derivatives, compounds bearing nitroxyl radicals, sterically hindered amines, nitro aromatic compounds, compounds bearing nitroso or N-nitroso function, phosphites, thioethers. As examples of inhibitors of the phenolic type, hydroquinone, hydroquinone monomethyl ether, ortho tertiobutyl phenol, 2,6-ditertiobutyl phenol, 2,6-ditertiobutyl paranitroso phenol, paracresol, 2,6-ditertiobutyl paracresol and 2,6-ditertiobutyl paramethoxyl phenol, can be cited among others.

The present invention relates also to a method of coating comprising applying to a substrate a film of an ultraviolet or visible light polymerizable and/or crosslinkable composition, said composition being as defined above, and curing said composition by exposing said film to ultraviolet or visible light. In particular, the curing of said composition is conducted to a tack-free state.

The coating compositions according to the invention can be applied to a variety of substrates such as wood, paper, particleboard, chipboard, metals, metals having primers thereon, glass, plastics, and metallized plastics. The film of the composition may be applied on the substrate by any known means, for example, dipping, spraying, roll coating, curtain machine and so on.

When the coating composition is intended to be cured by ultraviolet light, any suitable source which emits an ultraviolet light having a wavelength ranging from 180 to 400 nm, such as mercury arcs, carbon arcs, low pressure or medium pressure or high pressure mercury lamps, swirl-flow plasma arcs and ultraviolet light emitting diodes, is used. The output of such lamps in the form of long tubes is of about 30–240 watts by cm across the length of the tube.

Generally, the substrate coated with a thin film of the composition is passed under one or more above-mentioned lamps at a rate of 1 to 300 meters per minute.

Lamps which are suitable to conduct such a polymerization without any photocuring promotor are lamps marketed by the Company FUSION under the names F300 bulb D or H, F450 Bulb D, F600 Bulb D or H or Excimer.

The present invention relates also to polymerized and/or crosslinked compositions obtained by the crosslinking of the compositions as mentioned above, and also to substrates having thereon a cured film obtained by curing an ultraviolet or visible light polymerizable and/or crosslinkable composition, said composition being as defined above.

The following examples illustrate the present invention without however limiting the scope thereof.

Synthesis Example 1

1 mole of isopropanolamine is slowly added to a solution cooled to 5° C. of maleic anhydride (1 mole) in acetone (200 ml). After having stirred the mixture for 2 h at room temperature, acetone is evaporated. Then 600 ml of toluene and 4 moles of maleic anhydride are added. The reaction mixture is refluxed (110° C.) for 4 h, then toluene is evaporated. To 30 g of the obtained mixture, 14.7 g of propyleneglycol, 200 ppm of hydroquinone and 15 ppm of copper naphthenate are added. The reaction medium is heated firstly at 160° C. then at 200° C. with removing the condensation water, the end of the reaction being conducted under reduced pressure. The reaction is stopped when an acid value of 60 mg KOH/g is reached. The number average molecular weight of the resulting prepolymer, determined by GPC (polystyrene standard), is 1875. The prepolymer contains 0.36 mole of maleimide functions by kg of resin.

Synthesis Example 2

15 g of isopropanolamine are slowly added to a solution cooled to 5° C. of maleic anhydride (19.6 g) in acetone (30 ml). After having stirred the mixture for 2 h at room temperature, acetone is evaporated. Then 100 ml of toluene, 78.4 g of maleic anhydride and 0.7 g of zinc chloride are added. To 60 g of the obtained mixture, 32.2 g of propylene glycol, 15 ppm of copper naphthenate and 200 ppm of hydroquinone are added. The reaction medium is heated at 180–200° C. with removing the condensation water, the end of the reaction being conducted under reduced pressure. The reaction is stopped when an acid value of 49 mg KOH/g is reached. The number average molecular weight of the resulting prepolymer, determined by GPC (polystyrene standard), is 1249. The prepolymer contains 0.54 mole of maleimide functions by kg of resin.

Synthesis Example 3

37.5 g of isopropanolamine are slowly added to a solution cooled to 5° C. of maleic anhydride (49 g) in acetone (75 ml). After having stirred the mixture for 2 h at room temperature, acetone is evaporated. Then 250 ml of toluene, 196 g of maleic anhydride and 8.2 g of sodium acetate are added. The reaction medium is refluxed for 4 h, then the toluene is evaporated. To 70 g of the obtained mixture, 32.3 g of propylene glycol, 15 ppm of copper naphthenate and 200 ppm of hydroquinone are added. The reaction medium is heated at 180–200° C. with removing the condensation water, the end of the reaction being conducted under reduced pressure. The reaction is stopped when an acid value of 49 mg KOH/g is reached. The number average molecular weight of the resulting prepolymer, determined by GPC (polystyrene standard), is 1382.

Synthesis Example 4

One mole of furan is slowly added to a solution at 5° C. of maleic anhydride (1 mole) in 200 ml of acetone, then is stirred for 12 h at room temperature. Then, acetone is added in order to entirely solubilize the addition product. 1 mole of isopropanolamine is slowly added to the solution cooled to 5° C. After having stirred the mixture for 2 h at room temperature, acetone is evaporated. Then 600 ml of toluene and 4 moles of maleic anhydride are added. The reaction medium is refluxed for 4 h, then the solvent is evaporated. To 30 g of the obtained mixture, 15.2 g of propylene glycol, 200 ppm of hydroquinone and 15 ppm of copper naphthenate are added. The reaction mixture is heated at first at 160° C. then at 200° C. with removing the condensation water, the end of the reaction being conducted under reduced pressure. The reaction is stopped when an acid value of 40 mg KOH/g is reached. The number average molecular weight of the resulting prepolymer, determined by GPC (polystyrene standard), is 1951.

Synthesis Example 5

The synthesis is conducted in the same way as in the Synthesis example 1 for the first two steps. To 110 g of the mixture obtained after evaporation of toluene, 84.6 g of diethylene glycol, 15 ppm of copper naphthenate and 200 ppm of hydroquinone are added. Then the reaction medium is heated to 180–200° C. With removing of the condensation water, the end of the reaction being conducted under reduced pressure. The reaction is stopped when an acid value of 38 mg KOH/g is reached. The number average molecular weight of the resulting prepolymer, determined by GPC (polystyrene standard), is 1362.

Synthesis Example 6

0.3 mole of ethanolamine are added to a solution of maleic anhydride (0.6 mole) in 170 ml of toluene. The solution is heated for 2 h at 80° C. Then, 300 ml of toluene and 0.9 mole of maleic anhydride are added. The reaction medium is refluxed for 4 h and the solvent is evaporated. 1 mole of propylene glycol, 200 ppm of hydroquinone and 15 ppm of copper naphthenate are added. The reaction medium is heated at 160° C. then at 200° C., with removing the condensation water, the end of the reaction being conducted under reduced pressure. The reaction is stopped when an acid value of 44 mg KOH/g is reached. The number average molecular weight of the resulting prepolymer, determined by GPC (polystyrene standard), is 1248.

Synthesis Example 7

1.4 mole of maleic anhydride is dissolved in 300 ml of chloroform at 600C. The heating is stopped, the addition conducted dropwise of 2-methyl-1,5-pentamethylene diamine (0.7 mole) is started and the reaction medium is stirred for 3 h at room temperature after that the addition is finished. Then the solvent is evaporated. To 0.07 mole of the obtained reaction product, 0.21 mole of maleic anhydride, 50 ml of toluene are added, the reaction medium is refluxed for 4 h, then the solvent is evaporated. To 35 g of the obtained mixture, 15.4 g of propylene glycol, 200 ppm of hydroquinone and 15 ppm of copper naphthenate are added. The reaction medium is heated at 160° C., then at 200° C., with removing the condensation water, the end of the reaction being conducted under reduced pressure. The reaction is stopped when an acid value of 58 mg KOH/g is reached. The number average molecular weight of the resulting prepolymer, determined by GPC (polystyrene standard), is 1308. The prepolymer contains 1.20 mole of maleimide functions per kg of resin.

Synthesis Example 8

98 g of maleic anhydride dissolved in 50 ml of THF are slowly added to a solution at 60° C. of 117.1 g of valine in 150 ml of THF. After having stirred for 7 h at 60° C., the solvent is evaporated. To 20.3 g of the obtained mixture, 27.7 g of maleic anhydride, 150 ml of toluene are added, the reaction medium is refluxed for 4 h, then the solvent is evaporated. To 44.0 g of the obtained mixture, 25.6 g of propylene glycol, 15 ppm of copper naphthenate and 200 ppm of hydroquinone are added. The reaction medium is heated at 180–200° C. With removing the condensation water, the end of the reaction being conducted under reduced pressure. The reaction is stopped when an acid value of 36 mg KOH/g is reached. The number average molecular weight of the resulting prepolymer, determined by GPC (polystyrene standard), is 1438.

Synthesis Example 9

The synthesis is conducted in the same way as in Synthesis example 1 for the first two steps. To 300 g of the mixture obtained after evaporation of toluene, 75 g of propylene glycol, 104.7 g of diethylene glycol, 200 ppm of hydroquinone and 15 ppm of copper naphthenate are added. Then the reaction medium is heated at 180° C., then at 200° C., with removing the condensation water, the end of the reaction being conducted under reduced pressure. The reaction is stopped when an acid value of 45 mg KOH/g is reached. The number average molecular weight of the resulting prepolymer, determined by GPC (polystyrene standard), is 2689.

Synthesis Example 10

0.26 mole of isopropanolamine is slowly added to a solution cooled to 5° C. of maleic anhydride (0.26 mole) in acetone (50 ml). After having stirred the mixture for 2 h at room temperature, the acetone is evaporated. Then 150 ml of toluene and 1.04 mole of succinic anhydride are added. The reaction medium is refluxed for 4 h, then the toluene is evaporated. 0.82 mole of propylene glycol, 200 ppm of hydroquinone and 15 ppm of copper naphthenate are added. The reaction medium is heated at 160° C., then at 200° C. With removing the condensation water, the end of the reaction being conducted under reduced pressure. The reaction is stopped when an acid value of 60 mg KOH/g is reached. The number average molecular weight of the resulting prepolymer, determined by GPC (polystyrene standard), is 1166.

Synthesis Example 11

0.5 mole of isopropanolamine is slowly added to a solution cooled to 5° C. of maleic anhydride (0.5 mole) in 100 ml of acetone. After having stirred the mixture for 2 h at room temperature, the acetone is evaporated. Then 300 ml of ethanol are added, the reaction medium is refluxed for 4 h and ethanol is evaporated. To 66 g of the obtained product, 15.7 g of maleic anhydride, 12.8 g of propylene glycol, 15 ppm of copper naphthenate and 200 ppm of hydroquinone are added. The reaction medium is heated at 180–200° C. With removing the condensation water, the end of the reaction being conducted under reduced pressure. The reaction is stopped when an acid value of 40 mg KOH/g is reached. The number average molecular weight of the resulting prepolymer, determined by GPC (polystyrene standard), is 1451.

Synthesis Example 12

2.82 g of isopropanolamine are slowly added to 18.4 g of maleic anhydride at 65° C., then the reaction medium is heated at 100° C. for 2 h. Then 11 g of propylene glycol, 15 ppm of copper naphthenate and 200 ppm of hydroquinone are added, and the reaction medium is heated at 180–200° C. With removing the condensation water, the end of the reaction being conducted under reduced pressure. The reaction is stopped when an acid value of 48 mg KOH/g is reached. The number average molecular weight of the resulting prepolymer, determined by GPC (polystyrene standard), is 1857.

Synthesis Example 13

5.63 g of isopropanolamine are slowly added to 36.75 g of maleic anhydride at 65° C. The mixture is heated at 80° C. for 1 h, at 100° C. for 1 h, and at 120° C. for 2 h. Then, 20.8 g of propylene glycol, 15 ppm of copper naphthenate and 200 ppm of hydroquinone are added, and the reaction medium is heated at 180–200° C. With removing the condensation water, the end of the reaction being conducted under reduced pressure. The reaction is stopped when an acid value of 58 mg KOH/g is reached. The number average molecular weight of the resulting prepolymer, determined by GPC (polystyrene standard), is 1313. The prepolymer contains 0.49 mole of maleimide functions by kg of resin.

Synthesis Example 14

15 ppm of copper naphthenate, 200 ppm of hydroquinone, then slowly 3.75 g of isopropanolamine are added to 24.5 g of maleic anhydride at 65° C. The reaction medium is heated at 80° C. for 30 min., at 100° C. for 1 h, then at 120° C. for 1 h. Then, 30.7 g of 2-butyl-2-ethyl-1,3-propanediol are added, and the reaction medium is heated at 180–200° C. With removing the condensation water, the end of the reaction being conducted under reduced pressure. The reaction is stopped when an acid value of 38 mg KOH/g is reached. The number average molecular weight of the resulting prepolymer, determined by GPC (polystyrene standard), is 1555.

Synthesis Example 15

15 g of isopropanolamine are slowly added to 98 g of maleic anhydride at 60° C. When the addition is over, the mixture is heated at 120° C. for 2 h. 37 g of propyleneglycol, 15 ppm of copper naphthenate and 200 ppm of hydroquinone are added to 60.5 g of the mixture as obtained. The reaction medium is heated to 180° C. With removing the condensation water, the end of the reaction being conducted under reduced pressure. The reaction is stopped when an acid value of 12 mg KOH/g is reached. 1,36 g of phenyl glycidyl ether and 25 mg of benzyltriethylammonium chloride are added to 23.7 g of the polymer as obtained, brought at a temperature of 115° C. After a stirring conducted at 130° C. for 2 h, the prepolymer has an acid value of 1.5 mg KOH/g.

Synthesis Example 16

1.55 g of allyl glycidyl ether are added at 105° C. to 31.3 g of the prepolymer prepared in Synthesis example 15 (having an acid value of 12 mg KOH/g). The temperature is gradually raised from 105 to 140° C. over a duration of 2 h 45 min. The prepolymer as obtained has then an acid value of 2 mg KOH/g.

Synthesis Example 17

3.75 g of isopranolamine are added to a mixture at 60° C. of maleic anhydride (24.5 g) and propylene glycol (14.6 g) containing 15 ppm of copper naphthenate and 200 ppm of hydroquinone. Then, the reaction medium is heated at 160° C., then at 200° C. With removing the water condensation, the end of the reaction being conducted under reduced pressure. The reaction is stopped when an acid value of 45 mg KOH/g is reached. The number average molecular weight of the resulting prepolymer, determined by GPC (polystyrene standard), is 1319. The prepolymer contains 0.48 mole of malimide functions by kg of resin.

Synthesis Example 18

15 g of isopropanolamine are slowly to 98 g of maleic anhydride at 60° C. The reaction medium is heated at 80° C. for 30 min, at 100° C. for 30 min, then at 120° C. for 1 h. To 111 g of the obtained mixture, 108.3 g of propylene glycol, 15 ppm of copper naphthenate and 200 ppm of hydroquinone are added. The reaction medium is heated at 180–200° C. With removing the condensation water, the end of the reaction being conducted under reduced pressure. The reaction is stopped when an acid value of 24 mg KOH/g is reached. To 30 g of the obtained mixture, 3.5 g of trimethylhexamethylene diisocyanate are added, and the reaction medium is heated for 2 h at 70° C. The reaction is stopped when an hydroxyl value of 160 mg KOH/g is reached. The number average molecular weight of the resulting prepolymer, determined by GPC (polystyrene standard), is 1534.

Synthesis Example 19

4.58 g of ethanolamine are slowly added to 36.7 g of maleic anhydride at 60° C. When the addition is over, the mixture is heated at 120° C. for 2 h. Then 24.88 g of ethylene glycol, 200 ppm of hydroquinone and 100 ppm of a tin esterification catalyst are added. The reaction medium is heated to 180° C. With removing the condensation water, the end of the reaction being conducted under reduced pressure. The reaction is stopped when an acid number of 2 mg KOH/g is reached. To 100 g of the prepolymer as obtained, brought to a temperature of 140° C., 1.5 equivalent by residual carboxylic acid function of a monofunctional epoxy is added together with a catalyst of the epoxy/carboxylic acid reaction. After 0.5 h at 140° C., a prepolymer is obtained, which has an acid value lower than 0.5 mg KOH/g, and a number average molecular weight (determined by GPC, polystyrene standard), of 1100. The prepolymer contains 0.46 mole of maleimide functions by kg of resin.

Synthesis Example 20

1 mole of isopropanol amine is slowly added to a solution cooled to 5° C. of maleic anhydride (1 mole) in acetone (200 ml). After having stirred the mixture for 2 h at room temperature, acetone is evaporated. Then 600 ml of toluene and 4 moles of maleic anhydride are added. The reaction medium is refluxed for 4 h, then toluene is evaporated. To 25 g of the obtained mixture, 40.2 g of polyoxypropylene diamine, 20 ml of xylene, 300 ppm of hydroquinone are added, and the reaction medium is heated at 180° C. With removing the condensation water, the end of the reaction being conducted under reduced pressure. The reaction is stopped when an acid value of 69 mg KOH/g is reached. The number average molecular weight of the resulting prepolymer, determined by GPC (polystyrene standard), is of 1063.

In all the synthesis examples 1 to 20, the NMR $^{13}$C has allowed to confirm the presence of maleimide groups carried by the obtained prepolymers.

In all Application examples which follow, except otherwise stated, the formulations are applied onto glass with a K hand coater bar, in order to obtain a film having a thickness of 12 µm. When the curing is carried out by ultraviolet light, the lamp used, except otherwise stated, is a lamp F450 (H-bulb), having an output of 120 W/cm, put on the market by the Company FUSION. The hardness is measured after 24 h at room temperature.

Application Example 1

32.95 g of butanedioldivinylether (BDVE) are added to 67.05 g of the prepolymer obtained in Synthesis example 1. A film having a pencil hardness of H is obtained after 1 passage under the lamp at 54 m/min. 4 passages at 35 m/min. lead to a hardness of 3H.

Application Example 2

41.2 g of triethylene glycoldivinylether (Rapicure® DVE-3, ISP) are added to 58.8 g of the prepolymer obtained in Synthesis example 1. A film having a pencil hardness of 4H is obtained after 4 passages under the lamp at 35 m/min.

Application Example 3

29.7 g of BDVE and 10 g of trimethylolpropanetriacrylate (SR351) are added to 60.3 g of the prepolymer obtained in Synthesis example 1. A film having a pencil hardness of 3H is obtained after 2 passages under the lamp at 35 m/min.

Application Example 4

32.95 g of BDVE are added to 67.05 g of the polymer obtained in Synthesis example 4. A film having a pencil hardness of 3H is obtained after 2 passages under the lamp at 35 m/min. 4 pasages at 35 m/min. lead to a hardness of 5H.

Application Example 5

32.7 g of BDVE are added to 67.3 g of the prepolymer obtained in Synthesis example 6. A film having a pencil hardness of 2H is obtained after 2 passages under the lamp at 100 m/min. 2 passages at 54 m/min. lead to a hardness of 3H.

Application Example 6

32.9 g of BDVE and 20 g of N-phenyl maleimide are added to 62.1 g of the prepolymer obtained in Synthesis example 6. A film having a pencil hardness of 3H is obtained after 1 passage under the lamp at 35 m/min.

Application Example 7

31.9 g of BDVE are added to 68.1 g of the prepolymer obtained in Synthesis example 7. A film having a pencil hardness>7H is obtained after 2 passages under the lamp at 54 m/min.

Application Example 8

31 g of BDVE are added to 69 g of the prepolymer obtained in Synthesis example 9. A film having a pencil hardness of 3H is obtained after 1 passage under the lamp at 35 m/min.

Application Example 9

39 g of DVE-3 are added to 61 g of the prepolymer obtained in Synthesis example 9. A film having a pencil hardness of HB is obtained after 4 passages under the lamp at 35 m/min.

Application Example 10

15.3 g of BDVE and 25 g of trimethylolpropane triacrylate (SR 351) are added to 59.7 g of the prepolymer obtained in Synthesis example 17. A film having a pencil hardness of 5B is obtained after 7 passages under the lamp at 10 m/min.

Application Example 11

30.5 g of BDVE are added to 69.5 g of the prepolymer obtained in Synthesis example 15. A film having a pencil hardness of H is obtained after 1 passage under the lamp at 54 m/min.

Application Example 12

32.7 g of BDVE are added to 67.3 g of the prepolymer obtained in Synthesis example 11. A film having a pencil hardness of 3H is obtained after 2 passages under the lamp at 54 m/min.

Application Example 13

24.2 g of BDVE are added to 75.8 g of the prepolymer obtained in Synthesis example 17. A film having a pencil hardness of 4H is obtained after 4 passages under the lamp at 54 m/min.

Application Example 14

33 g of BDVE, 0.5 g of Darocure® 1173 and 0.5 g of Irgacure® 186 are added to 67 g of the prepolymer obtained in Synthesis example 1. A film having a pencil hardness of 4H is obtained after 1 passage under the lamp at 54 m/min.

Application Example 15

32.7 g of BDVE and 0.1 g of Darocure® 1173 are added to 67.3 g of the prepolymer obtained in Synthesis example 6. A film having a pencil hardness of 4H is obtained after 2 passages under the lamp at 54 m/min.

Application Example 16

32.7 g of BDVE and 1.0 g of Darocure® 1173 are added to 67.3 g of the prepolymer obtained in Synthesis example 6. A film having a pencil hardness of 3H is obtained after 1 passage under the lamp at 100 m/min.

Application Example 17

30 g of hexanediol diacrylate (SR238) and 0.5 g of Darocure® 1173 are added to 70 g of the prepolymer obtained in Synthesis example 6. A film having a pencil hardness of HB is obtained after 3 passages under the lamp at 54 m/min.

Application Example 18

31 g of BDVE, 0.5 g of Darocure® 1173 and 0.5 g of Irgacure® 184 (Ciba-Geigy) are added to 69 g of the polymer obtained in Synthesis example 9. A film having a pencil hardness of 4H is obtained after 2 passages under the lamp at 100 m/min.

Application Example 19

31 g of BDVE and 1 g of Darocure® 1173 (Ciba-Geigy) are added to 69 g of the prepolymer obtained in Synthesis example 9. A film having a pencil hardness of H is obtained after 2 passages under the lamp at 100 m/min.

Application Example 20

29.8 g of BDVE, 1 g of Darocure® 1173, 4 g of benzophenone and 1 g of acrylated amine (CN 386) are added to 66.2 g of the prepolymer obtained in Synthesis example 9. A film having a pencil hardness of 2H is obtained after 2 passages under the lamp at 100 m/min.

Application Example 21

15.3 g of BDVE, 25 g of trimethylolpropane triacrylate (SR 351) and 2 g of Darocure® 1173 are added to 59.7 g of the prepolymer obtained in Synthesis example 17. A film having a pencil hardness of 2B is obtained after 1 passage under the lamp at 10 m/min.

Application Example 22

53.2 g of triethyleneglycol divinyl ether and 9.5 g of yellow pigment diarylide 13 are added to 37.3 g of the prepolymer obtained in Synthesis example 1. The formulation is applied with a K handcoater bar, under the form of a film having a thickness of 6 μm, and the crosslinking is carried out with a medium lamp Hg/Xe having an output of 80 watts/cm. A dry film, perfectly crosslinked, is obtained after 4 passages under the lamp at 30 m/min.

Application Example 23

The same result as in Example 22 is obtained when used, as the pigment, phthalocyanine blue (βform).

Comparative Application Examples

The five following comparative examples have been carried out with an unsaturated polyester resin obtained by esterification at 200° C., at the atmospheric pressure, then under reduced pressure (200 mbars), of a mixture containing 24.5 g of maleic anhydride, 20.9 g of propyleneglycol, 15 ppm of copper naphthenate and 200 ppm of hydroquinone. The obtained resin has an acid value of 45 mg KOH/g and a number average molecular weight, determined by GPC (polystyrene standard), of 1913.

Comparative Example 1

31 g of BDVE are added to 69 g of the polyester resin as obtained above. A film having a pencil hardness of 4H is obtained after 9 passages under the lamp at 54 m/min.

Comparative Example 2

31.5 g of BDVE and 10.4 g of N-phenylmaleimide are added to 58.1 g of the polyester resin as obtained above. A film having a pencil hardness of H is obtained after 10 passages under the lamp at 100 m/min. 6 passages at 54 m/min. lead to a hardness of H.

Comparative Example 3

30.6 g of BDVE and 12.9 g of N-cyclohexylmaleimide are added to 56.5 g of the polyester resin as obtained above. A film having a pencil hardness of 3H is obtained after 6 passages under the lamp at 100 m/min.

Comparative Example 4

31 g of BDVE and 0.1 g of Darocure® 1173 are added to 69 g of the polyester resin as obtained above. A film having a pencil hardness of 3H is obtained after 4 passages under the lamp at 54 m/min.

Comparative Example 5

31.5 g of BDVE, 10.4 g of N-phenylmaleimide and 1 g of Darocure® 1173 are added to 58.1 g of the polyester resin as obtained above. A film having a pencil hardness of 3H is obtained after 5 passages under the lamp at 35 m/min.

The two following comparative examples have been carried out with an unsaturated polyester resin obtained by esterification at 200° C., at the atmospheric pressure, then under reduced pressure (200 mbar), of a mixture containing 50 g of maleic anhydride, 21.3 g of propylene glycol, 29.7 g of diethylene glycol, 15 ppm of copper naphthenate and 200 ppm of hydroquinone. The obtained resin has an acid value of 49 mg KOH/g and a number average molecular weight, determined by GPC (polystyrene standard), of 1070.

Comparative Example 6

28.3 g of BDVE are added to 71.7 g of the resin as obtained above. After 8 passages under the lamp at 35 m/min., a tacky film which shows a pencil hardness <6B is obtained.

Comparative Example 7

35.9 g of DVE-3 are added to 64.1 g of the resin as obtained above. After 11 passages under the lamp at 35 m/min., a tacky film which shows a pencil hardness <6B is obtained.

In the Table I below, are mentioned the minimum UV doses (expressed in $J/cm^2$ and measured with an UV Power Puck radiometer of the Company EIT) in order to obtain a tack-free film in the case of some application examples of the invention and of the comparative application examples which correspond to them.

TABLE I

| Prepolymer having maleimide functions | | | Unfunctionalized prepolymer | | |
| --- | --- | --- | --- | --- | --- |
| Application Example N° | UV dose $(J/cm^2)$ | Hardness | Comparative Application Example N° | UV Dose $(J/cm^2)$ | Hardness |
| 1 or 11 | 0.19 | H | 1 | 1.71 | 4H |
|  |  |  |  | 1.14 | H |
|  |  |  | 3 | 0.77 | 3H |
| 15 | 0.38 | 4H | 4 | 0.76 | 3H |
| 16 | 0.128 | 3H | 5 | 1.43 | 3H |
| 8 | 0.29 | 3H | 6 | 2.30 | <6B |
| 9 | 1.15 | HB | 7 | 3.16 | <6B |

Application Example 24

32.1 g of DVE-3 are added to 67.9 g of the prepolymer obtained in Synthesis Example 19. A film having a pencil hardness of HB is obtained after 4 passages under the lamp at 20 m/min. Five passage at 8 m/min. lead to a pencil hardness of 2H.

Application Example 25

32.1 g of DVE-3 0.5 g of Darocure® 1173 and 0.5 g of Irgacure® 184 are added to 67.9 g of the prepolymer obtained in Synthesis example 19. A film having a pencil hardness of 4B is obtained after 2 passages under the lamp at 54 m/min.

The four following comparative examples 8 to 11 have been carried out with the polymer the preparation of which is given hereinbelow.

A mixture constituted by 49 g of maleic anhydride, 42.5 g of ethylene glycol, 200 ppm of hydroquinone and 1000 ppm of a tin esterification catalyst is gradually heated to 200° C. The condensation water is removed first at the atmospheric pressure and then under reduced pressure. The resin as obtained has an acid value of 1 mg KOH/g.

1.5 equivalent per residual carboxylic acid function of a monofunctional epoxy, together with a catalyst of the epoxy/carboxylic acid reaction are added to 61 g of this resin. After 0.5 h at 140° C., a prepolymer is obtained, which has an acid value lower than 0.5 mg KOH/g and a number average molecular weight (determined by GPC, polystyrene standard) of 1000.

Comparative Application Example 8

37.6 g of DVE-3 are added to 62.4 g of the comparative prepolymer as obtained above. A dry film, having a pencil hardness of 2B, is obtained after 15 passages under the lamp at 20 m/min. Five passages at 8 m/min lead to a pencil hardness <7B.

Comparative Application Example 9

37.6 9 of DVE-3, 0.5 g of Darocure® 1173 and 0.5 g of Irgacure® 184 are added to 62.4 g of the comparative prepolymer as obtained above. A film having a pencil hardness of 4B is obtained after 4 passages under the lamp at 54 m/min.

Comparative Application Example 10

38.3 g of DVE-3 and 7.4 g of N-hydroxyethyl maleimide are added to 54.3 g of the comparative prepolymer as obtained above. A film having a pencil hardness of 4B is obtained after 11 passages under the lamp at 20 m/min. Five passages at 8 m/min lead to a pencil hardness of 2B.

Comparative Application Example 11

38.3 g of DVE-3, 7,4 g of N-hydroxyethyl maleimide, 0.5 g of Darocure® 1173 and 0.5 g of Irgacure® 184 are added to 54.3 g of the comparative prepolymer as obtained above. A film having a pencil hardness of 4B is obtained after 4 passages under the lamp at 54 m/min.

Other results are given in the following Tables II to IV.

TABLE II

Minimum UV dose necessary to obtain a tack free film in the absence of photoinitiator

| | Prepolymer having maleimide functions | Unfunctionalized prepolymer | Unfunctionalized prepolymer + Free maleimide |
|---|---|---|---|
| Application Example N° | 24 | Comparative 8 | Comparative 10 |
| UV Dose (J/cm²) | 2 | 6.7 | 5.5 |

TABLE III

Characteristics of the films obtained by crosslinking without photoinitiator with the same UV dose (5 passages at 8 m/mn = 6, 7 J/cm²)

| | Prepolymer having maleimide functions | Un-functionalized prepolymer | Unfunctionalized prepolymer + Free maleimide |
|---|---|---|---|
| Application Example N° | 24 | Comparative 8 | Comparative 10 |
| UV Dose (J/cm²) | 6.7 | 6.7 | 6.7 |
| Pencil hardness | 2 H | <7 B | 2 B |
| Acetone strength | 29 s | <1 s | <1 s |

TABLE IV

Minimum UV dose necessary to obtain a tack free film in the presence of 5% by weight of Darocure ® 1173 and 0.5% by weight of Irgacure ® 184

| | Prepolymer having maleimide functions | Unfunctionalized prepolymer | Unfunctionalized prepolymer + Free maleimide |
|---|---|---|---|
| Application Example N° | 25 | Comparatif 9 | Comparatif 11 |
| UV Dose (J/cm²) | 0.4 | 0.8 | 0.8 |

Although several embodiments have been presented, it should be clear to those skilled in this art that various modifications, alternatives and improvements can be made with departing from the spirit and scope of the invention as set forth in the following claims.

What is claimed is:

1. Compositions polymerizable and/or crosslinkable by ultraviolet or visible light, comprising at least one compound (A) containing electron depleted olefinic double bonds; and at least one compound (B) containing electron enriched olefinic double bonds, wherein said at least one compound (A) is selected from the group consisting of prepolymers having maleimide functional groups (f):

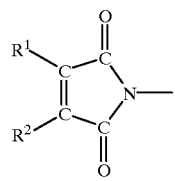

(f)

wherein each of R and $R^2$ represents independently H, a $C_1$–$C_{12}$ alkyl group, or a halogen, being prepared by reacting:
at least one maleic anhydride represented by formula (I):

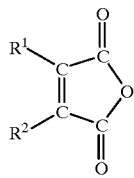
(I)

at least one amino functional compound (II) having at least one —NH$_2$ functional group and at least one other functional group F selected from the group consisting of —OH, —NH$_2$, —NH—, —COOH,

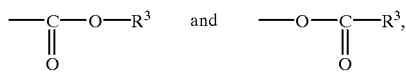

wherein
R$^3$ is a C$_1$–C$_5$ alkyl group;
at least one compound (III) to form the chain of the prepolymers by polycondensation and/or polyaddition, said compounds (III) being defined as:
when the N-substituted maleimide has a functional group F which is —OH, NH$_2$ or —NH—, said compound (III) comprises
(a) at least one compound selected from the group consisting of a polyacid, a cyclic anhydride; and mixtures thereof;
(b) at least one compound selected from the group consisting of a polyol, a mono- or polyfunctional epoxy, a polyamine, and a polyisocyanate; or
(c) at least one polyisocyanate; or at least one polyisocyanate and at least one compound selected from the group consisting of a polyol, a mono- or polyfunctional epoxy, a polyacid, a cyclic anhydride, and a polyamine;
when the N-substituted maleimide has a functional group F which is —COOH, said compound (III) comprises
(a) at least one compound selected from the group consisting of a polyol, a mono- or polyfunctional epoxy, and a polyamine; or
(b) at least one compound selected from a polyol a mono- or a polyfunctional epoxy and a polyamine; and at least one compound selected from a polyacid, a cyclic anhydride and a polyisocyanate; or
(c) of at least one polyisocyanate; or
(d) at least one polyisocyanate and at least one compound selected from a polyol, a mono-or polyfunctional epoxy, a polyacid, a cyclic anhydride and a polyamine;
when the N-substituted maleimide has a functional group F which is —C(O)—O—R$^3$ said compound (III) comprises
(a) at least one compound allowing transesterification, having a functional group —OH and at least one other functional group selected from the group consisting of —OH, —NH— and —COOH; wherein when said other functional group is —OH or —NH—, the compounds (III) are (i) at least one compound selected from the group consisting of a polyacid and a cyclic anhydride and at least one compound selected from the group consisting of a polyol, a mono- or polyfunctional epoxy, a polyamine, and a polyisocyanate; or
(ii) at least one polyisocyanate; or
(iii) at least one polyisocyanate and at least one compound selected from the group consisting of a polyol, a mono- or polyfunctional epoxy, a polyacid, a cyclic anhydride and a polyamine; and
wherein when said other functional group is —COOH, the compounds (III) comprise
(i) at least one compound selected from the group consisting of a polyol, a mono- or polyfunctional epoxy and a polyamine; or
(ii) at least one compound selected from the group consisting of a polyol, a mono- or polyfunctional epoxy and a polyamine; and at least one compound selected from a polyacid, a cyclic anyhydride and a polyisocyanate; or
(iii) at least one polyisocyanate; or
(iv) a polyisocyanate and at least one compound selected from the group consisting of a polyol, a mono- or polyfunctional epoxy, a polyacid, a cyclic anhydride and a polyamine.
when the N-substituted maleimide has a functional group F which is —O—C(O)—R$^3$, the compounds (III) comprise
(a) at least one compound allowing transesterification, having an acid functional group and at least one other functional group selected from the group consisting of —OH, —NH— and —COOH; wherein
when said another functional group is —OH or —NH, the compounds (III) comprise
(i) at least one compound selected from the group consisting of a polyacid and cyclic anhydride; and at least one compound selected from the group consisting of a polyol, a mono- or polyfunctional epoxy, a polyamine, and a polyisocyanate; or
(ii) at least one polyisocyanate; or
(iii) a polyisocyanate and at least one compound selected from the group consisting of a polyol, a mono- or polyfunctional epoxy a polyacid, a cyclic anhydride and a polyamine;
when said other functional group is —COOH, the compounds (III) comprise
(i) at least one compound selected from the group consisting of a polyol, a mono- or polyfunctional epoxy, and a polyamine; or
(ii) at least one compound selected from the group consisting of a polyol, a mono- or polyfunctional epoxy and a polyamine; and at least one compound selected from the group consisting of a polyacid, a cyclic anhydride and a polyisocyanate; or
(iii) at least one polyisocyanate; or
(iv) at least one polyisocyanate and at least one compound selected from the group consisting of a polyol, a mono- or polyfunctional epoxy, a polyacid, a cyclic anhydride and a polyamine;
said compounds (II) having first reacted with said maleic anhydrides (I) in order to open the maleic anhydride rings to form F functional compounds having groups of the formula (f'):

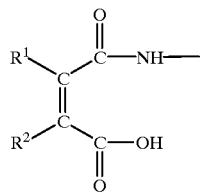

(f')

heating to form maleimides N-substituted by groups having a functional group F; and reacting said maleimides N-substituted by groups having a functional group F with at least one polyfunctional compound III, said compound III having functional groups reactive with said functional group F, without gelation of the reaction medium.

2. The compositions according to claim 1 wherein the equivalents ratio of anhydride to amino functional compounds is at least 1:1.

3. The compositions according to claim 1 or 2, wherein said anhydride (I) is maleic anhydride.

4. The compositions according to claim 1, wherein said amino-functional compound (II) is selected from the group consisting of

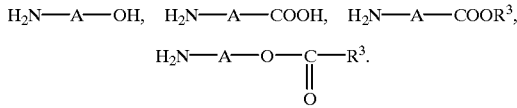

and

wherein A represents a straight, branched or cyclic alkylene group or arylene group, said group being optionally interrupted by oxygen or sulfur atoms, or by —NR⁴— groups, wherein R⁴ represents hydrogen or alkyl.

5. The compositions according to claim 4, wherein said compound (II) is selected from the group consisting of aminoalcohols selected from the group consisting of ethanolamine, propanolamine, isopropanolamine, 2-(2-aminoethoxy)ethanol, N-(2-amino-ethyl)ethanolamine;

aminoacids selected from the group consisting of valine, p-amino-benzoic acid, alanine, 2-aminohexanoic acid, 6-aminohexanoic acid, 7-aminoheptanoic acid, 2-aminoisobutyric acid;

the methyl or ethyl esters of said aminoacids;

the esters of carboxylic acids having 2 to 5 carbon atoms and said aminoalcohols;

diamines selected from the group consisting of ethylenediamine, 2-methyl- 1,5-pentamethylenediamine, hexamethylenediamine, 2,2,4- and/or 2,4,4-trimethylhexamethylenediamine, dodecamethylenediamine, 5-methylnonamethylenediamine, decamethylenediamine, isophoronediamine, bis(4-aminocyclohexyl)methane, bis(3-methyl-4-aminocyclohexyl)methane, bis(3-methyl-4-amino-5-ethylcyclohexyl)methane, 1,2-bis(4-aminocyclohexyl)-ethane, 2,2'-bis(4-aminocyclohexyl) propane, 2,2'-bis(3-methyl-4 -aminocyclohexyl) propane, 4,7-dioxadecane-1,10-dianine, 4,9-dioxadodecane- 1,1 2-diamine, 4,7, 10-trioxa-tridecane- 1,13 -diamine;

polyoxyethylenated and/or polyoxypropylenated di- or triamines; and trifunctional compounds selected from the group consisting of L-serine, 3-hydroxy 4-amino benzoic acid and 3-amino 4-hydroxy benzoic acid, and triamines selected from the group consisting of N-(2-aminoethyl)- 1,2-ethanediamine and N-(3-aminopropyl)-1,3-propanediamine.

6. The compositions according to claim 6 wherein the polyfunctional compounds (III) are polyols selected from the group consisting of propylene glycol, dipropylene glycol, diethylene glycol, ethylene glycol, 1,3-butanediol, 1,4-butanediol, neopentyl glycol, triethylene glycol, tripropylene glycol, butylene glycol, glycerol, trimethylol propane, 1,6-hexanediol, 1,4-cyclohexane diol, 1,4-cyclohexane dimethanol, 2-methyl- 1,3-propane diol, 2-butyl-2-ethyl- 1,3-propane diol, 1,2-bis(hydroxyethyl) cyclohexane, 4'-(2-hydroxyethoxy)-2,2-dimethyl-2-hydroxyacetophenone, 2,2-dimethyl-3-hydroxypropyl-2,2-dimethyl-3-hydroxypropionate, dibromoneopentylglycol, and polyether polyols, polyester polyols, and polyurethane polyols having a weight average molecular weight between 200 and 1000.

7. The compositions according to claim 1 wherein the polyfunctional compounds (III) are epoxy compounds selected from the group consisting of epichlorhydrine, 7-oxa-bicyclo [4.1.0]heptane, 3,4-epoxycyclohexylmethyl 3,4-epoxycyclohexane carboxylate, bisphenol A diglycidyl ether, 1,2-epoxyhexadecane, 3,3,3-trichloropropylene oxide, and allyl glycidyl ether.

8. The compositions according to claim 1 wherein the polyfunctional compounds (III) are polyisocyanates selected from the group consisting of 4,4'-diphenylmethane diisocyanate, trimethylhexamethylene diisocyanate, toluene diisocyanate, isophoronediisocyanate, tetramethylene diisocyanate, pentamethylene diisocyanate, 4,4'-dicyclohexylmethane diisocyanate, 2,2,4-trimethylhexamethylene- 1,6-diisocyanate, triphenylmethane-4,4',4"-triisocyanate, polymethylene polyphenylisocyanate, m-phenylene diisocyanate, p-phenylene diisocyanate, 1,5-naphtalene diisocyanate, naphtalene- 1,4-diisocyanate, diphenylene-4,4'-diisocyanate, 3,3'-bi-tolylene-4,4'-diisocyanate, 1,4-cyclohexylene dimethylene diisocyanate, xylylene- 1,4-diisocyanate, xylylene- 1,3 -diisocyanate, cyclohexyl- 1,4-diisocyanate 3,3'-dimethyldiphenylmethane-4,4'-diisocyanate, polyurea or polyurethane prepolymers having isocyanate ends, and polyisocyanates which contain an isocyanurate ring, and biurets having isocyanate end functions.

9. The compositions according to claim 1 wherein the polyfunctional compounds (III) are polyacids selected from the group consisting of maleic, fumaric, chloromaleic, citraconic, metaconic, itaconic, tetraconic, orthophthalic, isophthalic, terephthalic, succinic, methylsuccinic, adipic, sebacic, tetrabromophthalic, tetrachlorophthalic, glutaric, pimelic, and pyromellitic acids.

10. The compositions according to claim 1 wherein the polyfunctional compounds (III) are cyclic anhydrides selected from the group consisting of maleic anhydride, succinic anhydride, phthalic anhydride, trimellitic anhydride, pyromellitic anhydride, tetrahydrophthalic anhydride, hexahydrophthalic anhydride, chlorinated anhydrides such as chlorendic anhydride, tetrachlorophthalic anhydride and tetrabromophthalic anhydride, methyltetrahydrophthalic anhydride, nadic anhydride, methyl nadic anhydride, itaconic anhydride, citraconic anhydride, and glutaric anhydride.

11. The compositions according to claim 1 wherein the polyfunctional compounds (III) are polyamines selected from the group consisting of ethylene diamine, 2-methyl-1, 5-pentamethylene diamine, trimethylhexane-1,6-diamine, hexamethylene diamine, 2,2,4-and/or 2,4,4-trimethylhexamethylenediamine, dodecamethylenediamine, trimethylhexamethylenediamine, 5-methyl-nonamethylenediamine, decamethylenedi amine, isophoronediamine, bis(4-aminocyclohexyl)methane, bis(3-methyl-4-aminocyclohexyl)-methane, bis (3 -methyl-4-amino-5-ethylicyclohexl)methane, 1,2-bis(4-aminocyclohexyl) ethane, 2',2'-bis(4-aminocyclo-hexyl)propane, and 2,2'-bis (3-methyl-4-aminocyclo-hexyl)propane.

12. The compositions according to claim 1 wherein the polyfunctional compounds (III) are selected from the group consisting of 2-hydroxybenzene acetic acid, parahydroxy benzoic acid, metahydroxy benzoic acid, 2-hydroxy-3 -methyl benzoic acid, 2-hydroxy 4-methyl benzoic acid, 2-hydroxy 5-methyl benzoic acid, 2-(butylamino)-ethanol, 2-(cyclohexylamino)ethanol, 2-(phenylamino)-ethanol, 3-hydroxypiperidine, 4-hydroxypiperidine, dipropylene glycol, tripropylene glycol, triethylene glycol, 1,6-hexanediol, 1,4-cyclohexanediol, 1,4-cyclohexanedimethanol, 2-butyl 2-ethyl, 1,3-propanediol, and 1,2-bis (hydroxethyl) cyclohexane.

13. The compositions according to claim 6 wherein the polyfunctional compounds(III) are selected from the group consisting of 2-hydroxybenzene acetic acid, parahydroxy benzoic acid, metahydroxybenzoic acid, 2-hydroxy 3-methyl benzoic acid, 2-hydroxy 4-methyl benzoic acid, 2-hydroxy 5-methyl benzoic acid, N-methyl glycine, 2-methylamino benzoic acid, orthophthalic acid, terephthalic acid, isophthalic acid, adipic acid, pimelic acid, sebacic acid, tetrabromophthalic acid, and tetrachlorophthalic acid.

14. The compositions according to claim 1, having a number average molecular weight of prepolymers (A) between 350 and 5000.

15. The compositions according to claim 14, wherein the number average molecular weight of said prepolymers (A) is between 500 and 3000.

16. The compositions according to claim 1 wherein prepolymers (A) include 0.02 to 5 moles of maleimide groups per kg of prepolymer.

17. The prepolymers according to claim 1 wherein after formation of said prepolymers (A), the acid end functions of prepolymers (A) are reacted with a monoepoxy compound in order to adjust the acid value to a value lower than 5 mg KOH/g.

18. The compositions according to claim 1, wherein said at least one compound (A) further comprises at least one compound (A') selected from the group consisting of N-substituted maleimides, represented by the formula:

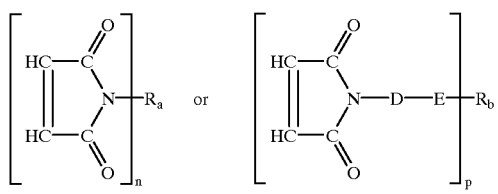

wherein:
R$_1$, R$_6$=mono- to tetravalent hydrocarbon group, which is aliphatic, aromatic or which has an aliphatic-aromatic structure;
n, p=1 to 4;
D=alkylene, arylene, alkylarylene or arylalkylene group; and
E is an ester linkage, COO or OC(O), or a urethane linkage, OCNH.

19. The compositions according to claim 1, wherein said component (B) is selected from the group consisting of at least one of:
(a) compounds represented by the formula (V):

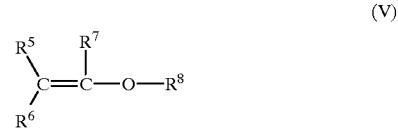

wherein:
each of R$^5$, R$^6$ and R$^7$ represents independently hydrogen, an aliphatic group;
R$^8$ represents an optionally substituted aliphatic group or an aromatic group;
(b) compounds represented by the formula (VI):

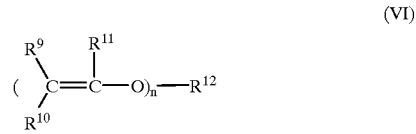

wherein:
each of R$^9$, R$^{10}$ and R$^{11}$ represents independently hydrogen, an aliphatic group;
R$^{12}$ is a n-valent residue of an organic polyol; and
n is an integer from 2 to 6;
N-vinyl pyrrolidone, N-vinyl imidazole, 2-vinyl pyridine, N-vinylcarbazole, N-vinyl caprolactam, para-methoxystyrene, isoeugenol, 4-propenyl-anisole, monobutyl 4-vinylbutoxy carbonate, monobutyl 4-propenyl butoxycarbonate, N-vinyl-formamide and its derivatives.

20. The compositions according to claim 19, wherein the aliphatic group for R$^5$, R$^6$, R$^7$, R$^9$, and R$^{11}$ is a C$_1$–C$_{12}$ alkyl group.

21. The compositions according to claim 1, wherein the ratio of the number of double bonds of said at least one electron enriched compounds (B) to the number of double bonds of said at least one electron depleted compounds (A) and optionally (A') is between 1:5 to 5:1.

22. The compositions according to claim 1, lacking a photoinitiator and a photosensitizer.

23. The compositions according to claim 1, further comprising at least one component selected from the group consisting of a monomer or oligomer reactive diluent, a non-reactive solvent or diluent, and a pigment.

24. A method of coating comprising
   (a) applying a film of the ultraviolet or visible light polymerizable and/or crosslinkable composition of claim 1 to a substrate; and
   (b) curing said composition by exposing said film to ultraviolet or visible light.

25. The method according to claim 24, wherein curing of the composition is conducted to a tack-free state.

26. Polymerized and/or crosslinked compositions obtained by crosslinking the compositions of claim 1.

27. Substrates having thereon a cured film obtained by curing the ultraviolet or visible light polymerizable and/or crosslinkable composition of claim 1.

* * * * *